US009312596B2

(12) United States Patent
Newman

(10) Patent No.: US 9,312,596 B2
(45) Date of Patent: Apr. 12, 2016

(54) MOBILE TOWER SYSTEM

(71) Applicant: Jerry Newman, Spangle, WA (US)

(72) Inventor: Jerry Newman, Spangle, WA (US)

( * ) Notice: Subject to any disclaimer, the term of this patent is extended or adjusted under 35 U.S.C. 154(b) by 0 days.

(21) Appl. No.: 13/919,732

(22) Filed: Jun. 17, 2013

(65) Prior Publication Data

US 2014/0370935 A1 Dec. 18, 2014

Related U.S. Application Data

(63) Continuation of application No. 11/701,558, filed on Jan. 31, 2007, now Pat. No. 8,467,741.

(51) Int. Cl.

| | |
|---|---|
| ***H04B 1/38*** | (2015.01) |
| ***H04M 1/00*** | (2006.01) |
| ***H01Q 1/32*** | (2006.01) |
| ***H01Q 1/12*** | (2006.01) |
| ***H01Q 1/24*** | (2006.01) |

(52) U.S. Cl.
CPC ............. *H01Q 1/1235* (2013.01); *H01Q 1/246* (2013.01)

(58) Field of Classification Search
USPC ............... 455/95, 97, 99, 344, 445, 347, 561, 455/562.1, 90.3, 575.1, 575.9
See application file for complete search history.

(56) References Cited

U.S. PATENT DOCUMENTS

| | | | | |
|---|---|---|---|---|
| 3,361,456 | A | 1/1968 | Durand | |
| 3,398,492 | A | 8/1968 | Nansel | |
| 4,932,176 | A | 6/1990 | Roberts et al. | |
| 5,537,125 | A | 7/1996 | Harrell, Jr. et al. | |
| 5,557,892 | A | 9/1996 | Lavin | |
| 5,571,406 | A | 11/1996 | Mensching | |
| 6,021,734 | A * | 2/2000 | Sperberg | 114/363 |
| 6,046,706 | A | 4/2000 | Vargas | |
| 6,189,712 | B1 | 2/2001 | Conrad et al. | |
| 2002/0139064 | A1 | 10/2002 | Norwood | |

FOREIGN PATENT DOCUMENTS

| | | | | |
|---|---|---|---|---|
| DE | 4441942 | | 5/1996 | |
| EP | 1 028 482 | A2 | 8/2000 | |
| GB | 1183181 | | 3/1970 | |
| GB | 1183181 | A * | 3/1970 | E04H 12/18 |

* cited by examiner

*Primary Examiner* — Blane J Jackson
(74) *Attorney, Agent, or Firm* — Wells St. John, PS

(57) ABSTRACT

This invention discloses a mobile tower system in which a telescoping tower may be with a plurality of tower structures may be extended to a height much greater than its contracted length. The tower may be transported horizontal, rotated to a vertical position and then the individual tower structures extended and secured via spring pins relative to the adjacent tower structure, the erection of the tower sections may be with external equipment such as a boom truck, or utilizing an internal hydraulic cylinder.

9 Claims, 14 Drawing Sheets

MOBILE TOWER SYSTEM

CROSS REFERENCE TO RELATED APPLICATION

This application claims priority as a continuation application of U.S. patent application Ser. No. 11/701,558, filed Jan. 31, 2007, entitled "Mobile Tower System", naming Jerry Newman as inventor, which is co-pending, and from which this application claims priority.

TECHNICAL FIELD

This invention relates to a mobile tower system for providing an expandable tower which can be moved from one location to another, and has applications, among others, for cell phone towers and antennas.

BACKGROUND OF THE INVENTION

The proliferation of the usage of cell phones around the world has created a strong demand for additional cell phone coverage and hence additional towers carrying cell phone antennas. In some cases the demand requires a temporary cell phone tower before permanent can be installed, and others there may only be a temporary need for the cell phone tower. In some cases the temporary tower system may be used on a more permanent basis.

For many reasons the cell phone towers need to be placed in locations which are not readily accessible for equipment and it is desirable to have a mobile system in which the tower can be driven directly to the location where it's to be installed and cranes or other heavy equipment are not necessary to get the tower to the specific location. In some circles the mobile tower systems are referred to as COWS, which stands for cells on wheels.

It is also desirable to provide towers which will need to exceed the maximum reasonable length that can be pulled behind a vehicle and therefore would also be an advantage for such a tower to be expandable and contractible so that it can more readily fit over a reasonably sized trailer, making it more mobile and also within the normal legal load and length requirements provided by traffic laws.

It is there an objective of aspects of this invention to provide a mobile tower system which may be expanded when placed at the desired tower location.

It is another objective of aspects of this invention to provide a tower system in which costly equipment such as cranes are not required to install it in an expanded state at a tower location.

It is a still further objective of some embodiments of this invention to provide such a tower system wherein biased spring pins may be mounted on tower structures and automatically insert into spring pin apertures on adjacent tower structures to secure adjacent tower structures with respect to one another and prevent relative movement therebetween.

While the invention was motivated in addressing some objectives, it is in no way so limited. The invention is only limited by the accompanying claims as literally worded, without interpretive or other limiting references to the specification, and in accordance with the doctrine of equivalents.

Other objects, features and advantages of this invention will appear from the specification, claims, and accompanying drawings which form a part hereof. In carrying out the objects of this invention, it is to be understood that it's essential features are susceptible to change in design and structural arrangements, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms “a”, “an”, and “the” as used in the claims herein are used in conformance with long-standing claim drafting practice and not in a limiting way. Unless specifically set forth herein, the terms “a”, “an”, and “the” are not limited to one of such elements, but instead mean “at least one”.

As will be appreciated by those of reasonable skill in the art, there are numerous embodiments to this invention, and variations of elements and components which may be used, all within the scope of this invention.

Figure 1:
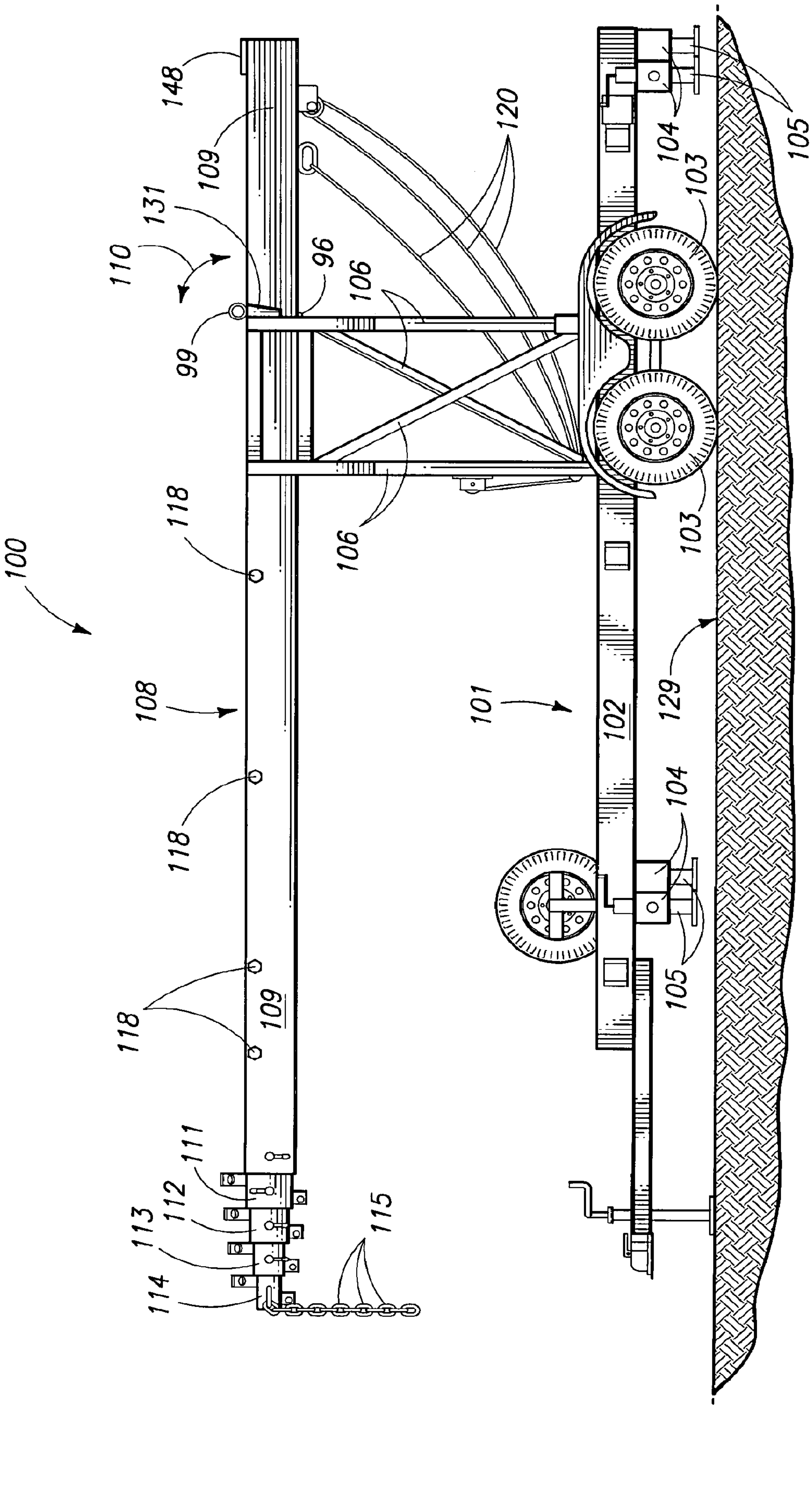
FIG. 1 is an elevation view of one embodiment of a mobile tower system which may be utilized in practicing the invention.

FIG. 1 is an elevation view of one embodiment of a mobile tower system which may be utilized in practicing the invention. FIG. 1 illustrates a mobile tower system 100 with trailer 101, trailer framework 102, trailer wheels 103 and outriggers 104 providing expandable lateral support for the mobile tower system when the tower 108 is in its fully extended position. The outriggers 104 include ground contacts 105 which start in the upward position and are moved downward once the outriggers 104 are in their fully extended lateral position to provide lateral support for the trailer 101.

It will be appreciated by those of ordinary skill in the art that the ground contacts 105 may be connected to outriggers 104 in any one of a number of different ways, such as by hydraulic means or manual to allow the ground supports to come in firm contact with the ground to provide the necessary support. Similarly it will be appreciated by those of ordinary skill in the art that the outriggers 104 can be extended laterally in any one of a number of different ways, including manually or hydraulically, among others, in order to provide the lateral support desired for the particular mobile tower system 100 application. The wheels 103 are in contact with ground 129 and it is intended that each of the four outriggers 104 will provide ground supports 105 which are also in contact with ground 129.

FIG. 1 further illustrates a tower framework 106 mounted to trailer 101 to provide the structure which supports the tower 108 and allows it to be rotated into the vertical position for expansion and use. It will be appreciated by those of ordinary skill in the art that the framework may be any one of a number of different conditions all within the contemplation of this invention, as long as it provides the support for the tower 108 on the trailer 101, and facilitates the rotation of the tower 108 with respect to the framework 106, as illustrated by arrow 110.

The tower 108 includes step pegs 118 which may be bolts on the side of the tower to provide a step for operator to climb up the tower 108 when it is in the vertical position.

The tower 108 will be provided in a number of different sections, each one of which starting with the second fits within the first and so on successively so that the tower components fit within the preceding tower component to provide for the expansion and the contraction of the tower 108. First tower structure 109 includes an internal cavity in which second tower structure 111 slidably fits, and second tower structure 111 has an internal cavity into which third tower structure 112 slides. Similarly third tower structure 112 has an internal cavity into which fourth tower structure 113 slides and fourth tower structure 113 includes an internal cavity into which fifth tower structure 114 slides. The tower 108 is intended to be rotated from the horizontal position shown in FIG. 1 to a vertical position as shown in later Figures, and any one of a number of different ways may be utilized to accomplish this rotation. FIG. 1 for example shows winch line 120 which would be attached to the first end to the lower portion of first tower structure 109 to pull it downwardly about axis 96 as indicated by arrow 110 to move it to a vertical location. As shown in later figures, rods are inserted into rod apertures 99 once the tower is rotated to the substantially vertical position to prevent it from rotating back to the horizontal position.

In one embodiment of the invention, the tower structure may be square in cross sectional configuration with first tower structure 109 being eight inches, second tower structure 111 being seven inches, third tower structure 112 being six inches, fourth tower structure 113 being five inches and fifth tower structure 114 being four inches. These dimensions provide for the respective tower section structures to slide within one another to provide the expansion function.

Chain 115 may be attached to the particular tower structure which is being raised once the tower 108 is in the vertical position and then attached to the next tower structure to be raised and so on until the tower 108 is in the fully extended position.

Figure 2:
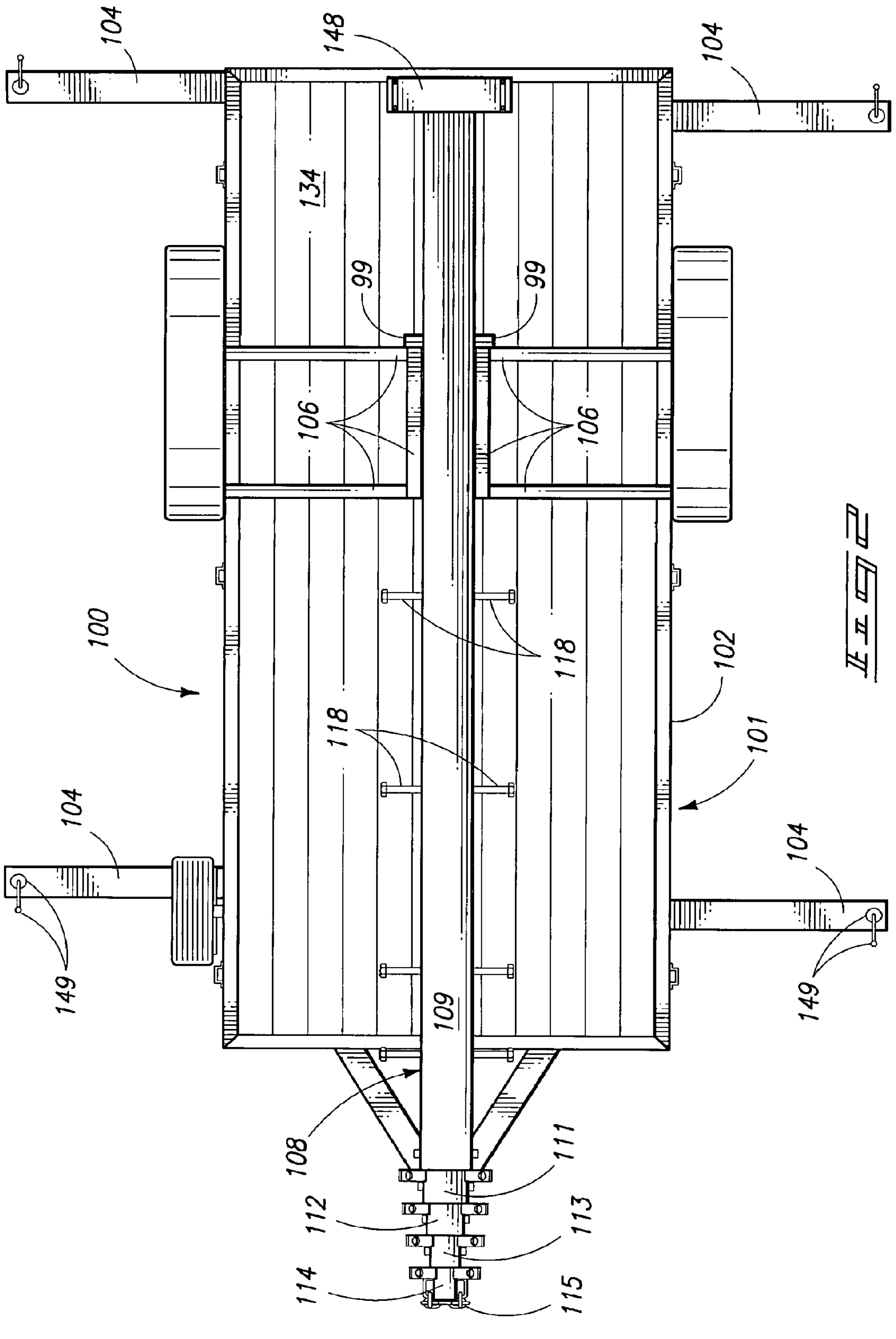
FIG. 2 is a top view of the mobile tower system illustrated in FIG. 1.

FIG. 2 is a top view of the mobile tower system illustrated in FIG. 1, FIG. 2 illustrates the mobile tower system shown in FIG. 1, with the outriggers 104 in their fully extended position. Cranks 149 are shown on outriggers 104 to provide a screw driven mechanism for the ground supports 105 to be extended downward to make contact with the ground and then to later be retracted upward when the outriggers 104 are to be contracted for travel. The movement of the ground supports 105 may be utilized to level the trailer or to place the tower 108 in a desired vertical position. FIG. 2 further illustrates trailer framework 102, first tower structure 109, second tower structure 111, third tower structure 112, fourth tower structure 113, fifth tower structure 114, chain 115 and step pegs 118 attached to first tower structure 109. The trailer also includes a deck 134 as a trailer base or working platform. FIG. 2 further illustrates tower framework 106.

Figure 3:
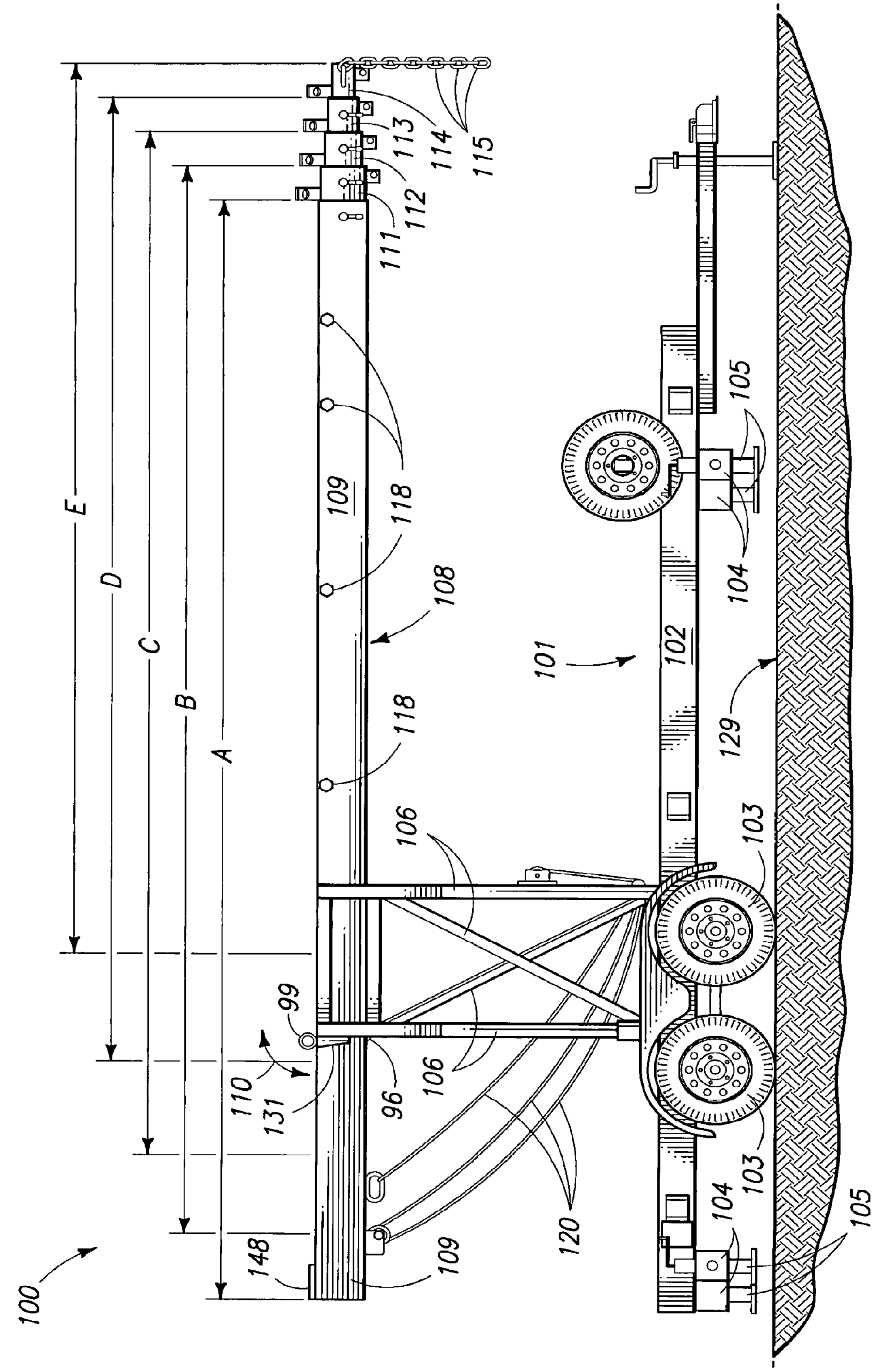
FIG. 3 is a second side elevation view of the mobile tower system illustrated in FIG. 1.

FIG. 3 is a second side elevation view of the mobile tower system illustrated in FIG. 1. FIG. 3 illustrates a mobile tower system 100 with trailer 101, trailer framework 102, trailer wheels 103 and outriggers 104 providing expandable lateral support for the mobile tower system when the tower 108 is in its fully extended position. The outriggers 104 include ground contacts 105 which start in the upward position and are moved downward once the outriggers 104 are in their fully extended lateral position to provide lateral support for the trailer 101. It will be appreciated by those of ordinary skill in the art that the ground contacts 105 may be connected to outriggers 104 in any one of a number of different ways, such as by hydraulic means or manual to allow the ground supports to come in firm contact with the ground to provide the necessary support. Similarly it will be appreciated by those of ordinary skill in the art that the outriggers 104 can be extended laterally in any one of a number of different ways, including manually or hydraulically, among others, in order to provide the lateral support desired for the particular mobile tower system 100 application. The wheels 103 are in contact with ground 129 and it is intended that each of the four outriggers 104 will provide ground supports 105 which are also in contact with ground 129.

FIG. 3 further illustrates a tower framework 106 mounted to trailer 101 to provide the structure which supports the tower 108 and allows it to be rotated into the vertical position for expansion and use.

The tower 108 includes step pegs 118 which may be bolts on the side of the tower to provide a step for operator to climb up the tower 108 when it is in the vertical position.

The tower 108 will be provided in a number of different sections, each one of which starting with the second fits within the first and so on successively so that the tower components fit within the preceding tower component to provide for the expansion and the contraction of the tower 108. First tower structure 109 includes an internal cavity in which second tower structure 111 slidably fits, and second tower structure 111 has an internal cavity into which third tower structure 112 slides. Similarly third tower structure 112 has an internal cavity into which fourth tower structure 113 slides and fourth tower structure 113 includes an internal cavity into which fifth tower structure 114 slides. The tower 108 is intended to be rotated from the horizontal position shown in FIG. 3 to a vertical position as shown in later Figures, and any one of a number of different ways may be utilized to accomplish this rotation. FIG. 3 for example shows winch line 120 which would be attached to the first end to the lower portion of first tower structure 109 to pull it downwardly about axis 96 as indicated by arrow 110 to move it to a vertical location.

In one embodiment of the invention, the tower structure may be square in cross sectional configuration with first tower structure 109 being eight inches, second tower structure 111 being seven inches, third tower structure 112 being six inches, fourth tower structure 113 being five inches and fifth tower structure 114 being four inches. These dimensions provide for the respective tower section structures to slide within one another to provide the expansion function.

Chain 115 may be attached to the particular tower structure which is being raised once the tower 108 is in the vertical position and then attached to the next tower structure to be raised and so one until the tower 108 is in the fully extended position.

Figure 4:
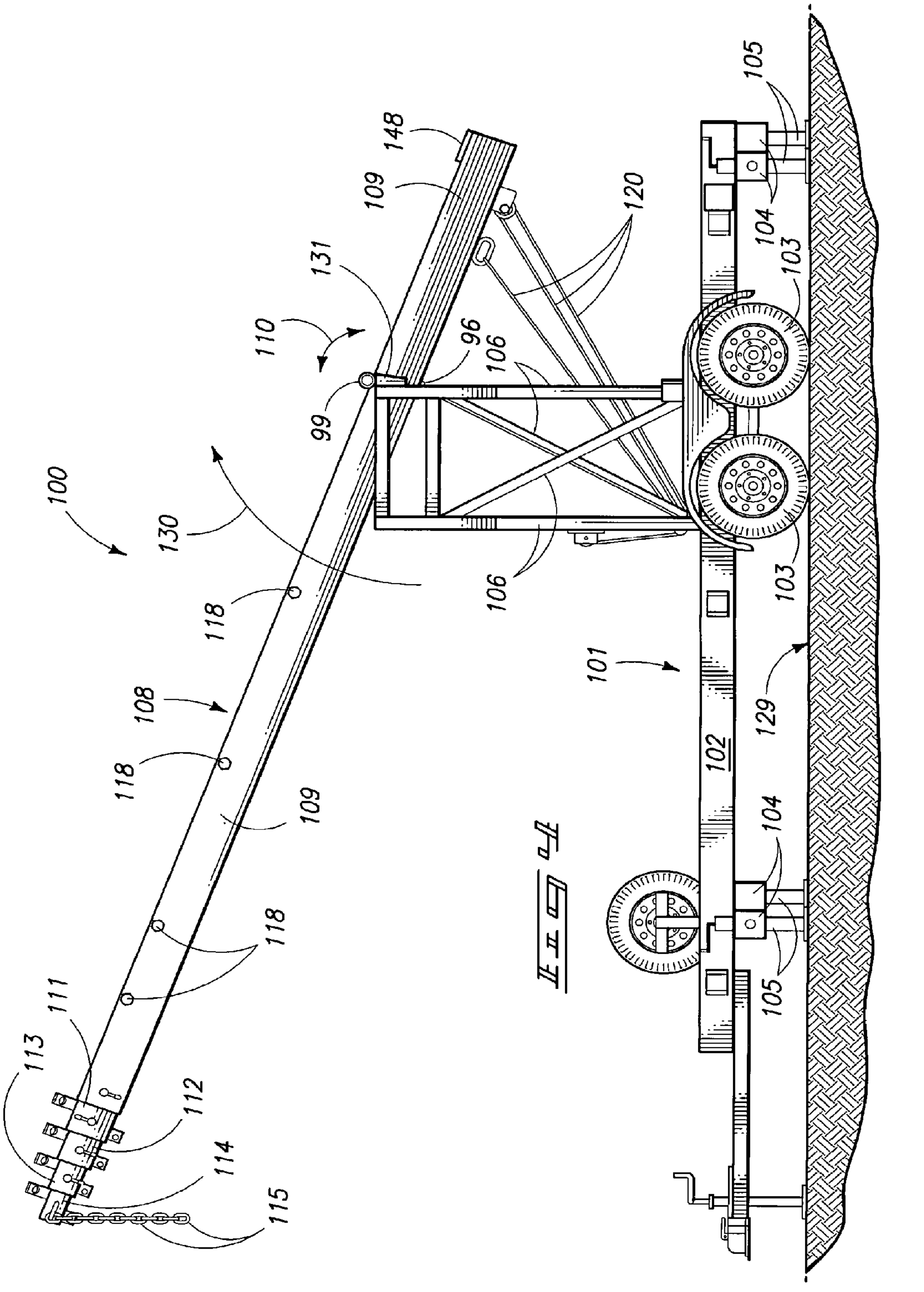
FIG. 4 is an elevation view of the mobile tower system illustrated in FIG. 1 with the tower partially rotated toward the vertical position.

FIG. 4 is an elevation view of the mobile tower system illustrated in FIG. 1 with the tower partially rotated toward the vertical position. FIG. 4 illustrates a tower 108 as being rotated per arrow 130 and about axis 96 as illustrated by arrow 110. Winch lines 120 are shown in the taut position as they are pulling the lower portion of first tower structure 109 downwardly to provide the rotation.

The components illustrated in FIG. 4 are the same as FIG. 1 and have like numbers and will not therefore again be discussed in detail with respect to FIG. 4.

It will be appreciated by those of ordinary skill in the art that while it is preferred that outriggers 104 be in their fully extended position and ground supports 105 be in contact with the ground 129, this may not be necessary in some embodiments of the invention while the rotation of the tower 108 is being accomplished to place the tower 108 from a horizontal into its vertical position. First tower structure 109 will fit between components of framework 106, though any one of a number of other configurations may be utilized so long as the first tower structure 109 is secured to the tower framework 106. FIG. 4 further shows how the first tower structure rotates about axis 96 when being rotated from a substantially horizontal position to a substantially vertical position.

Figure 5:
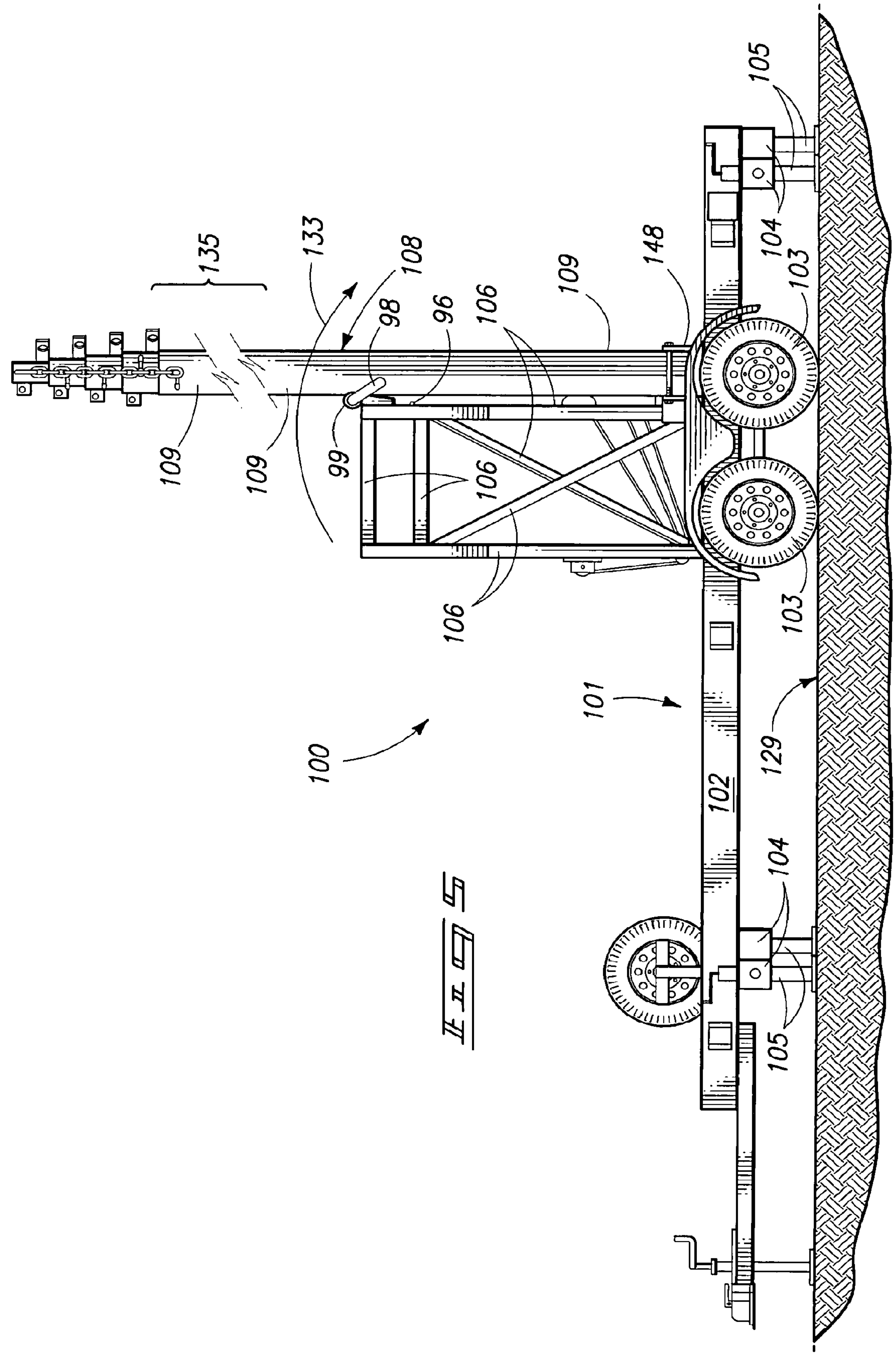
FIG. 5 is an elevation view of the mobile tower system in FIG. 1 with the tower having been rotated to the vertical position and before it is expanded.

FIG. 5 is an elevation view of the mobile tower system 100 in FIG. 1 with the tower 108 having been rotated to the vertical position and before it is expanded. FIG. 5 shows the mobile tower system 100 wherein the lower 108 has been rotated to its vertical position and secured in that position to tower framework 106. FIG. 5 illustrates axis 96 around which the tower was pivoted, and how rod 98 is inserted through rod apertures 99 to secure the tower and prevent it from rotating back toward the horizontal position. FIG. 5 is shown with a break in the tower 108 and not proportional as indicated at section 135 to provide a better illustration. FIG. 5 further shows trailer 101, trailer framework 102, ground 129, trailer wheels 103 and the multiple tower structures each slid within one another in the fully contracted position.

Figure 6:
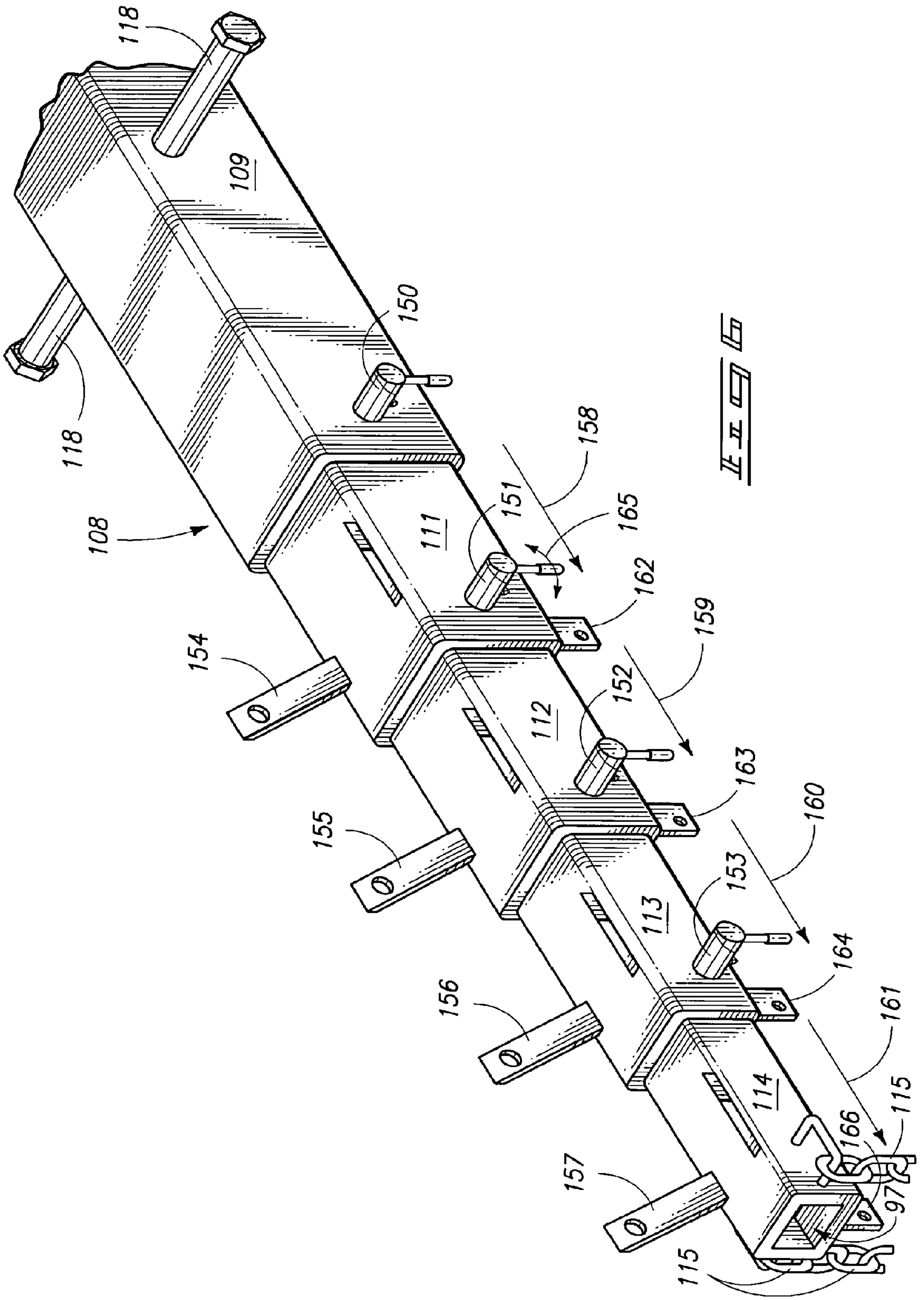
FIG. 6 is a close up perspective view of the various components of the mobile tower system illustrated in FIG. 1 which are part of the expansion of the tower system.

FIG. 6 is a close up perspective view of the various components of the mobile tower system illustrated in FIG. 1 which are part of the expansion of the tower system. FIG. 6 illustrates the individual components of tower 108, first tower structure 109, second tower structure 111, third tower structure 112, fourth tower structure 113, fifth tower structure 114, which each successively is slid within the preceding tower in the contracted state. Step pegs 118 are shown attached to first tower structure 109. Arrow 158 illustrates how second tower structure 111 slides relative to first tower structure 109. Arrow 159 illustrates how third tower structure 112 slides relative to and within second tower structure 111. Arrow 160 illustrates how fourth tower structure 113 slides with respect to and within third tower structure 112 and arrow 161 illustrates how fifth tower structure 114 slides relative to and within fourth tower structure 113. Guide wire connectors 154, 155, 156 and 157 are shown respectively attached to second tower structure 111, third tower structure 112, fourth tower structure 113, fifth tower structure 114 and provide eyelets to which guide wires can be attached and then secured to the ground at an extended position to provide support once the tower 108 is in its vertical position and fully extended.

Aperture 97 in fifth tower structure 114 may provide an aperture in which a component from an antenna or a mounting system for an antenna may be inserted to more easily secure an antenna to the fifth tower structure 114.

It will also be appreciated by those of ordinary skill in the art that while five tower structures are shown in this embodiment, that any number of tower structures may be provided within the contemplation of this invention, with this being one preferred way to practice the invention. Similarly, guide wire support 162 is shown attached to second tower structure 111, guide wire attachment 163 is shown attached to third tower structure 112, guide wire attachment 164 is shown attached fourth tower structure 113 and guide wire attachment 166 is shown attached to fifth tower structure 114.

FIG. 6 illustrates spring pins 150, 151, 152 and 153. Spring pin 150 is shown attached to first tower structure 109, second spring pin 151 is shown attached to second tower structure 111, third spring pin 152 is shown attached to third tower structure 112, fourth spring pin 153 is shown attached to fourth tower structure 113. These spring pins are leaf springs as shown in later Figures and provide a mechanism for providing both relative movement and securement of each respective tower structure to the adjacent tower structure. Arrow 165 illustrates how the handle on the spring pin 151 may rotated to retract the pin portion (not shown in FIG. 6).

Figure 7:
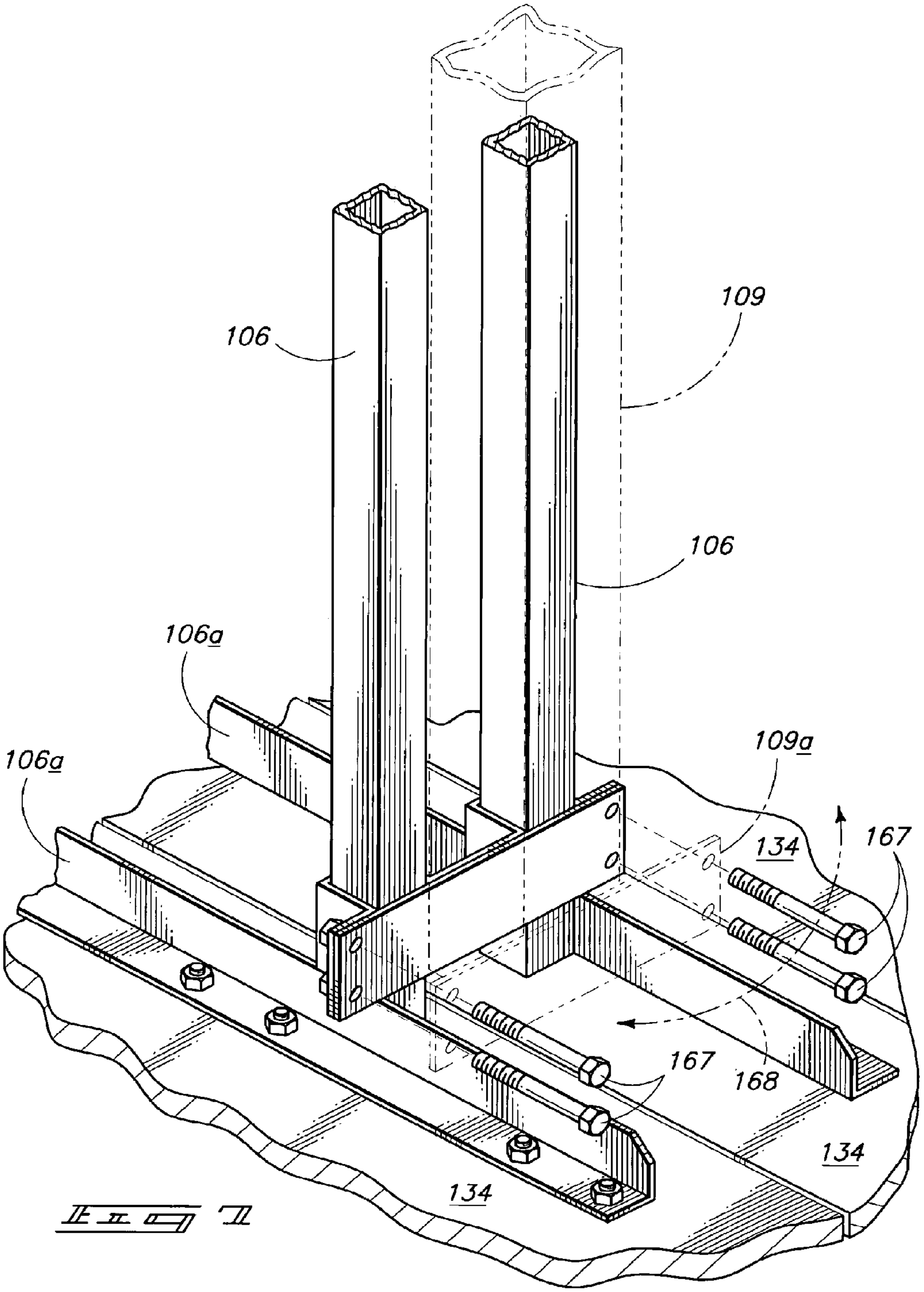
FIG. 7 is a perspective detail view of the base of the framework of the mobile tower system illustrated in FIG. 1.

FIG. 7 is a perspective detail view of the base of the framework of the mobile tower system illustrated in FIG. 1. FIG. 7 shows tower framework 106 components relative to first tower structure 109. Shown mounted on first tower structure 109 is first structure base plate **109*a* which may be attached any one of a number different ways to first tower structure 109 but which may be utilized to attach first tower structure 109 to tower framework 106 by any one of a number of different means, such as the bolts 167 shown. Arrow 168 shows the relative movement of first tower structure 109 relative to framework 106**.

Framework components **106*a* are shown attached to trailer decking 134 for securing the tower framework 106** to the trailer. Again it will be appreciated by those of ordinary skill in the art this may be accomplished any one of a number of different ways, with no one in particular being required to practice the invention.

Figure 8:
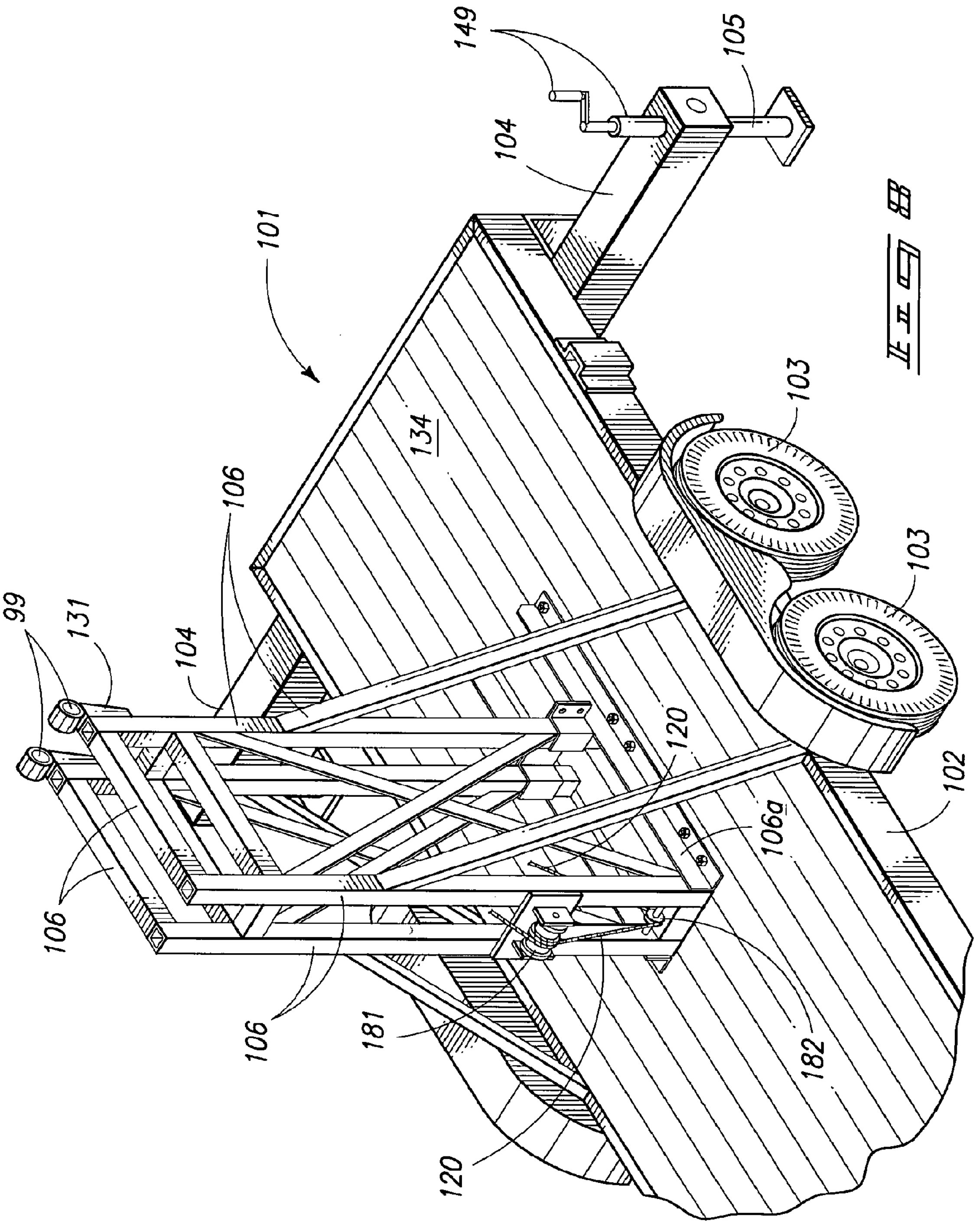
FIG. 8 is a front perspective view of the framework and trailer of the mobile tower system illustrated in FIG. 1.

FIG. 8 is a front perspective view of the framework and trailer of the mobile tower system illustrated in FIG. 1. FIG. 8 illustrates trailer 101, trailer decking 134, tower framework 106 with floor attachment components 106*a*, trailer framework 102, trailer wheels 103, outriggers 104 and ground supports 105. FIG. 8 shows a pulley and winching arrangement with winch line 120 wherein winch line is routed through pulley 182 and around pulley 181 would provide one of several different mechanism options for moving the tower 108 from horizontal to a vertical position or to any position in between.

It will also be appreciated by those of ordinary skill in the art that other drive systems such as a hydraulic cylinder, gear driven motor with appropriate attachments to the tower 108, may be utilized to provide the driving force to rotate the tower 108 with respect to tower framework 106.

Figure 9:
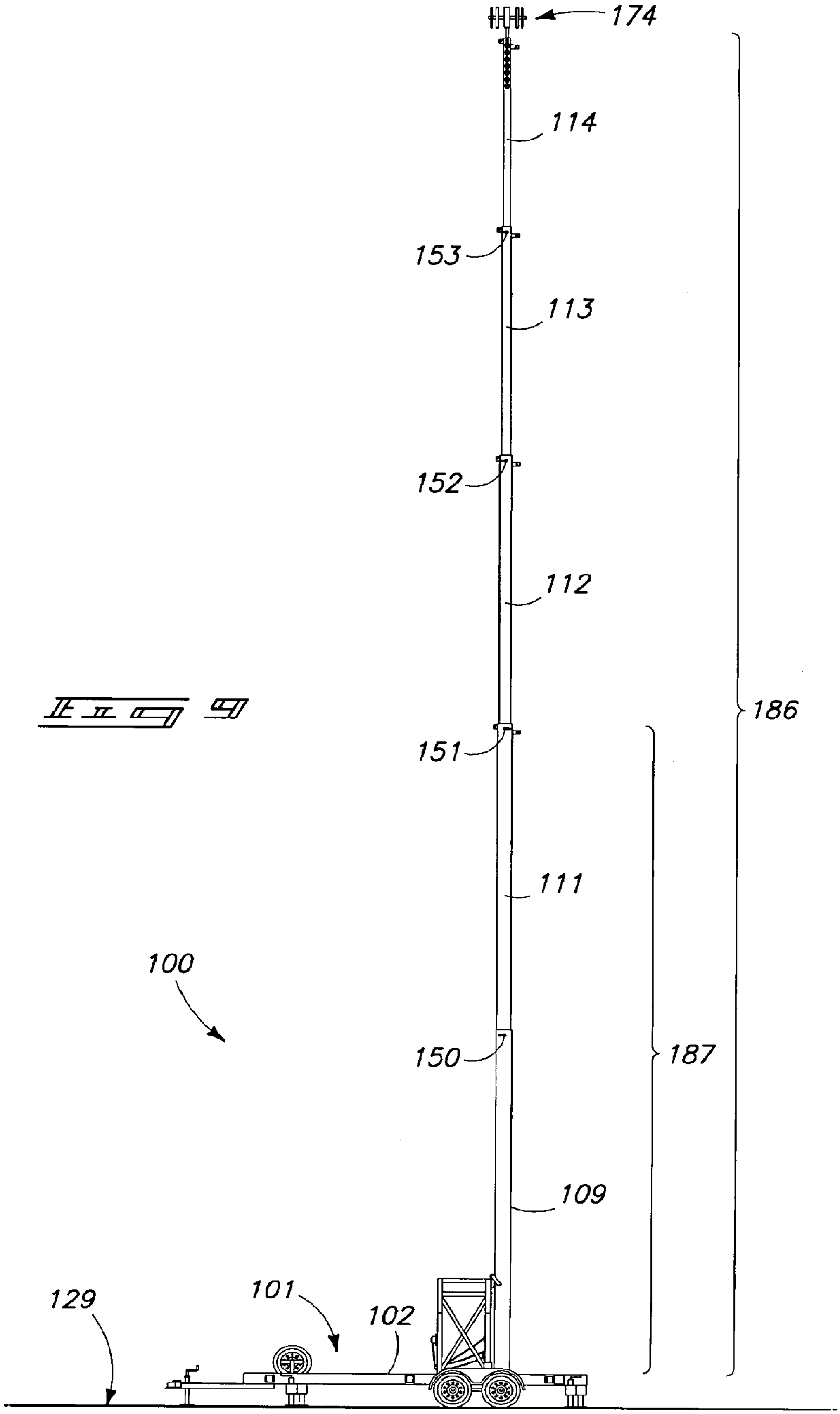
FIG. 9 is an elevation view of the mobile tower system illustrated in FIG. 1, in its expanded state with an antenna mounted thereon.

FIG. 9 is an elevation view of the mobile tower system illustrated in FIG. 1, in its expanded state with an antenna mounted thereon. FIG. 9 shows the mobile tower system 100 illustrated in FIG. 1 in its fully extended vertical position with an antenna 174 mounted. The height 186 of the tower system can be any one of a number of different heights depending upon the desired application of this mobile tower system 100. FIG. 9 illustrates trailer 101 on ground 129 with trailer framework 102, tower framework, outriggers and ground supports. First tower structure 109, second tower structure 111, third tower structure 112, fourth tower structure 113, fifth tower structure 114 are shown fixed in their extended position relative to one another respectively to produce the height 186 of the tower system. Spring pin 150 has one or more similar and identical spring pins 150 which secure first tower structure 109 to second tower structure 111. Second spring pin 151 similarly has one or more other spring pins around the perimeter of second tower structure 111 and secure second tower structure 111 relative to third tower structure 112 in the extended position of third tower structure 112 outside of the interior cavity of second tower structure 111. Third spring pin 152 is shown mounted on third tower structure 112 and one or more third spring pins 152 may be utilized to secure fourth tower structure 113 relative to third tower structure 112, as more fully described below. Fourth spring pin 153 is shown mounted on fourth tower structure 113 and it and possibly additional fourth spring pins 153 are utilized to secure fifth tower structure 114 relative to fourth tower structure 113.

There are multiple ways which may be utilized to extend each of the tower structures relative to the adjacent tower structure. One way is to use a boom truck and a desirable advantage of this invention is that the boom truck does not need to be able to extend the full height 186 of the mobile tower system, but instead only needs to be able to reach to the height of the top of the second tower structure 111 as shown by height 187 in FIG. 9. The sequence which may be utilized to extend the mobile tower system 100 is to secure the first tower structure 109 in the vertical position with the remaining tower structures fully contracted. The boom truck may first then attach to the top of fifth tower structure 114 which is near the top of 109 when all the tower structures are in a contracted position. The boom truck may slide fifth tower structure 114 upwardly within fourth tower structure 113 with the spring pin 153 being in the contracted but biased position. Once the fifth tower structure 114 is slid to a sufficient height the spring pin 153 will pop into an aperture within fifth tower structure 114 thereby securing the extended position of fifth tower structure 114 with respect to fourth tower structure 113. Again it will be appreciated that one or more spring pins 153 may be utilized around fourth tower structure 113 to mate with and insert into apertures within fifth tower structure 114 to secure it in the position shown.

Once fifth tower structure 114 is secured relative to fourth tower structure 113, then the procedure can be repeated to then extend fourth tower structure 113 relative to third tower structure 112 by detaching the boom from fifth tower structure 114 and attaching it to the top of fourth tower structure 113. Once the boom is attached to the top of fourth tower structure 113 then it may be raised until spring pins 152 click into apertures within fourth tower structure 113 to secure fourth tower structure 113 relative to third tower structure 112. Again, it will be appreciated that the boom will only have to be at the approximate height 187 to accomplish this since it is doing it one at a time and only one tower structure relative to the next.

Sequentially then once fourth tower structure 113 is secured relative to third tower structure 112, the boom can detach from fourth tower structure 113 and attach to the top of third tower structure 112 and follow a similar procedure to allow spring pins 151 to secure third tower structure 112 relative to second tower structure 111. The same sequence can be followed to secure second tower structure 111 relative to first tower structure 109 and spring pins 150 are utilized to secure second tower structure 111 in its extended position relative to first tower structure 109.

Figure 12:
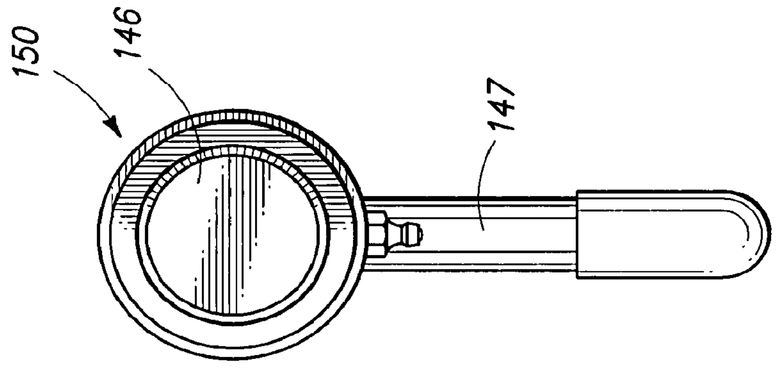
FIG. 12 is a second end view of the spring pin illustrated in FIG. 10.
Figure 11:
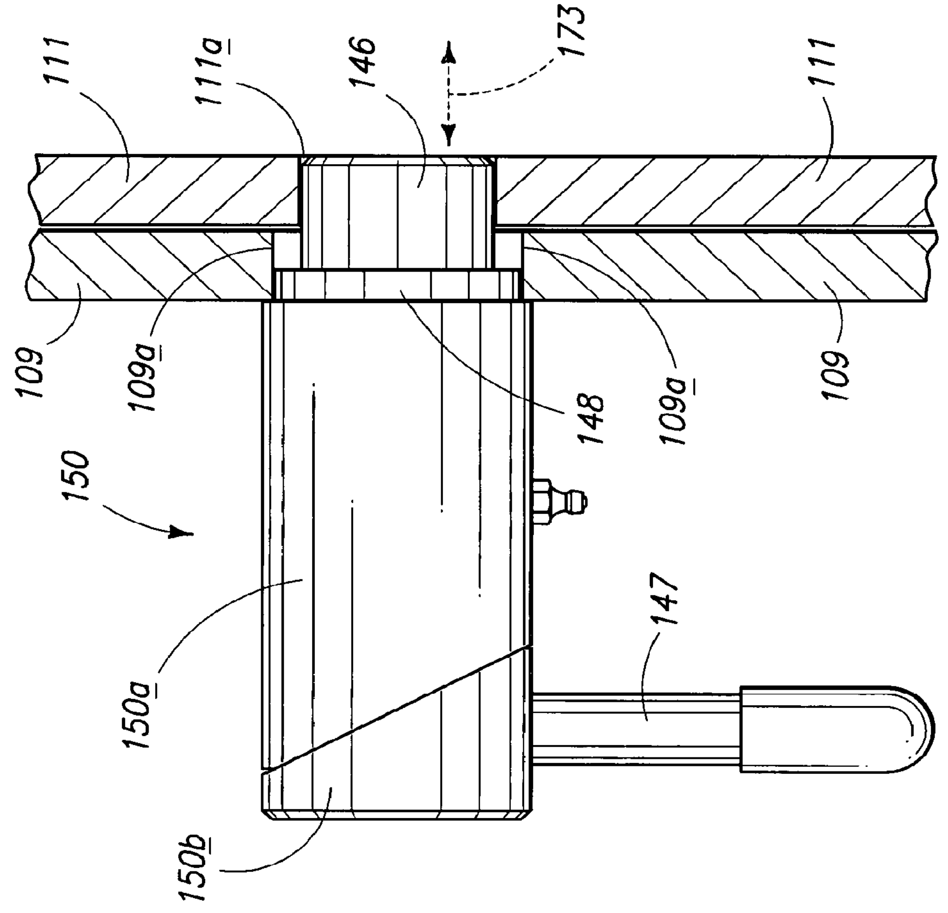
FIG. 11 is a front elevation view of the spring pin illustrated in FIG. 10.
Figure 10:
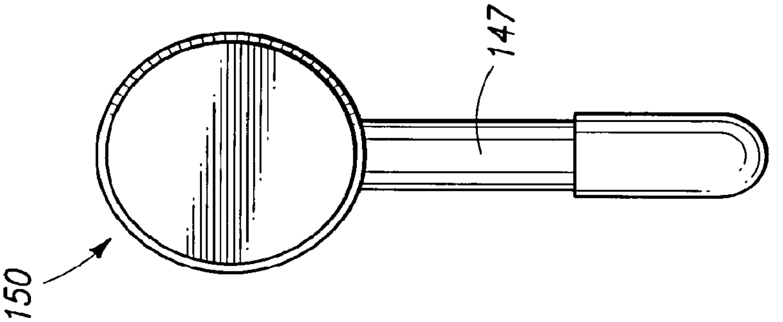
FIG. 10 is an end view of one embodiment of a cylinder pin or spring pin that may be utilized in the expansion of the mobile tower system illustrated in FIG. 1.
Figure 13:
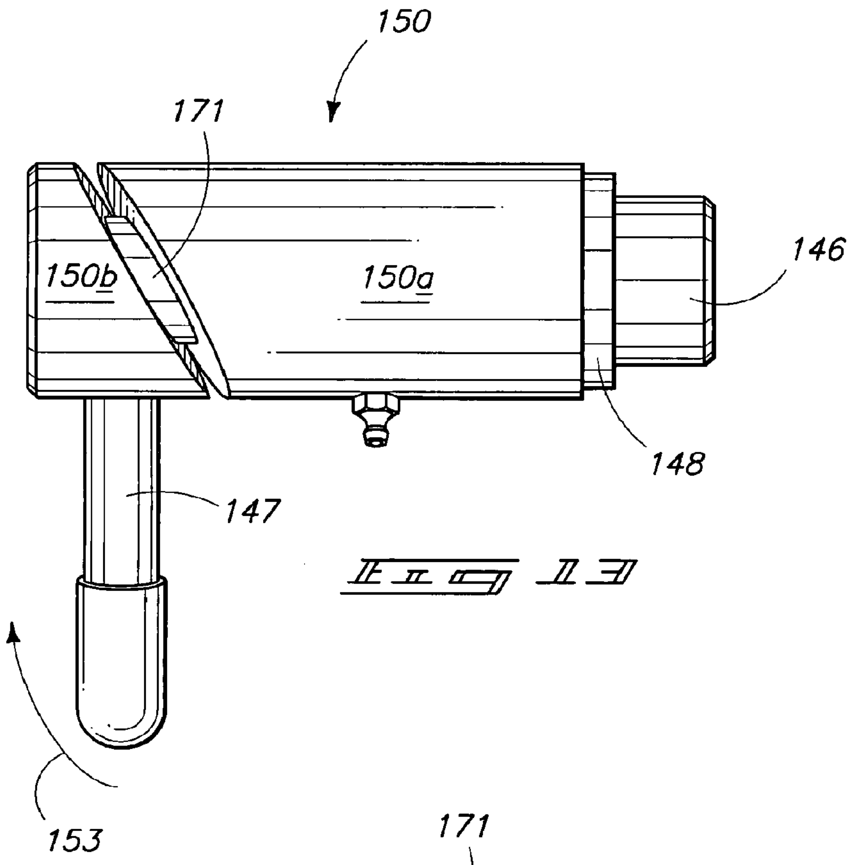
FIG. 13 is a front elevation view of the spring illustrated in FIG. 10, with the handle partially rotated.
Figure 16:
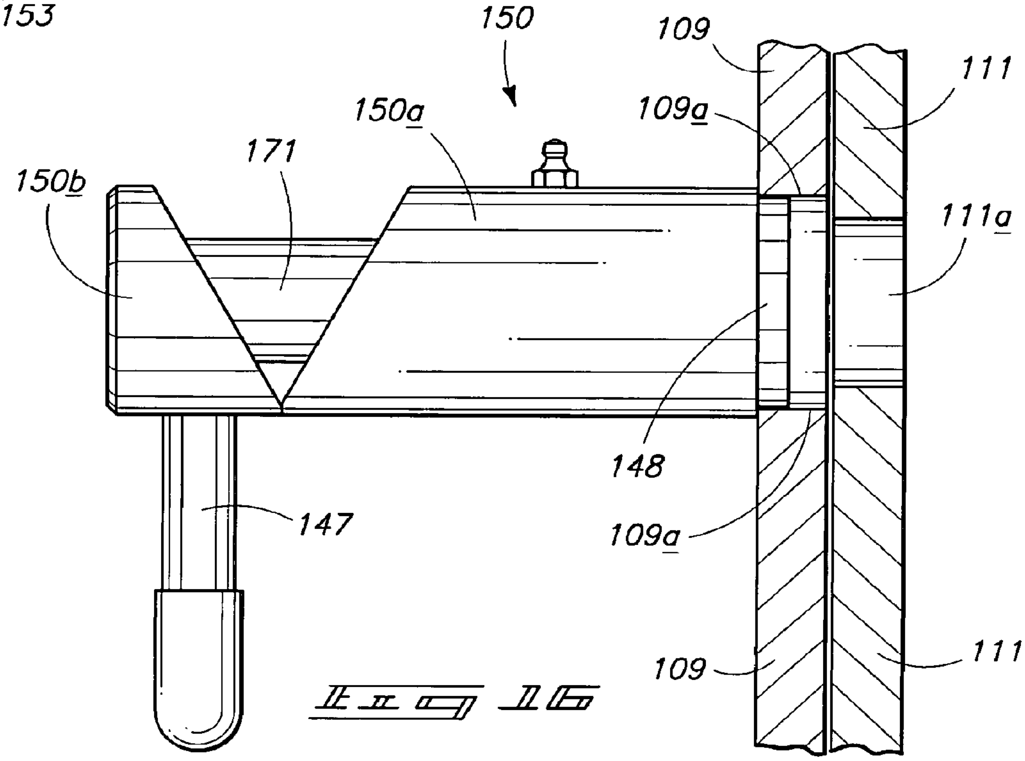
FIG. 16 is a front elevation view of the spring illustrated in FIG. 10, with the handle fully rotated to its fully biased position.

FIG. 10 is an end view of one embodiment of a cylinder pin or spring pin that may be utilized in the expansion of the mobile tower system illustrated in FIG. 1. FIGS. 10-12 illustrate one embodiment of a spring pin that may be utilized in practicing embodiments of this invention. The spring pin 150 being exemplary and referring to the one attached to first tower structure 109. However, spring pins 151, 152 and 153 are similar and the description relative to 150 is used for exemplary purposes in describing this invention. Spring pin 150 has handle 147, first body position 150*a* and second body portion 150*b* with shoulder mount 148 and pin 146. Arrow 173 shows how pin 146 may be moved and it may be retracted within first body section 150*a* by the movement of handle 147, as more fully shown in the series of Figures starting with FIG. 13 and ending with FIG. 16 wherein handle 147 is rotated approximately 180° to move pin 146 from its fully extended position as shown in FIG. 13 to its fully retracted as shown in FIG. 16. As second body portion 150*b* is moved relative to first body portion 150*a* by the rotation of handle 147, an internal spring resists the rotation and further load is imposed by the spring the further pin 146 is retracted. This retraction and loading of the spring places it in a biased status when pin 146 is retracted or fully retracted so that if pin 146 is abutting the exterior of a tower structure and then it is aligned with an aperture in that tower structure, it will release into the aperture and thereby provide securement of the tower structure into which it is released. Pin shaft 171 is shown in various degrees of exposure as handle 147 is rotated relative to the spring pin body 150*a* and an internal spring is attached as described above.

FIG. 11 is a front elevation view of the pin or spring that may be utilized in the expansion of the mobile tower system illustrated in FIG. 1. FIG. 11 shows how spring pin 150 may be mounted by shoulder mount 148 to first tower structure 109 through aperture 109*a* in first tower structure 109. Second tower structure 111 is then shown positioned within first tower Structure 109 and second tower structure aperture 111*a* is shown aligned with pin 146 such that pin 146 moved as shown by arrow 173 into second tower structure aperture 111*a*. Once pin 146 is inserted in the corresponding second tower structure aperture 111*a* it secures first tower structure 109 relative to second tower structure 111. If handle 147 is then rotated 180°, pin 146 is completely retracted within spring pin 150 and second tower structure 111 may be moved relative to first tower structure 109.

Figure 14:
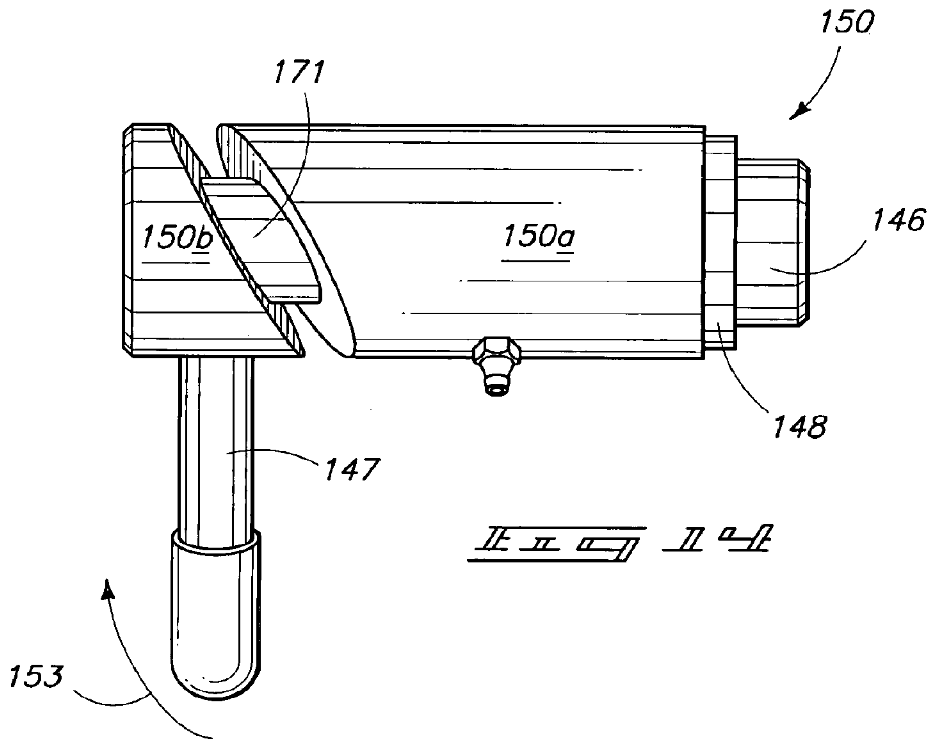
FIG. 14 is a front elevation view of the spring pin illustrated in FIG. 10, with the handle more fully rotated.
Figure 15:
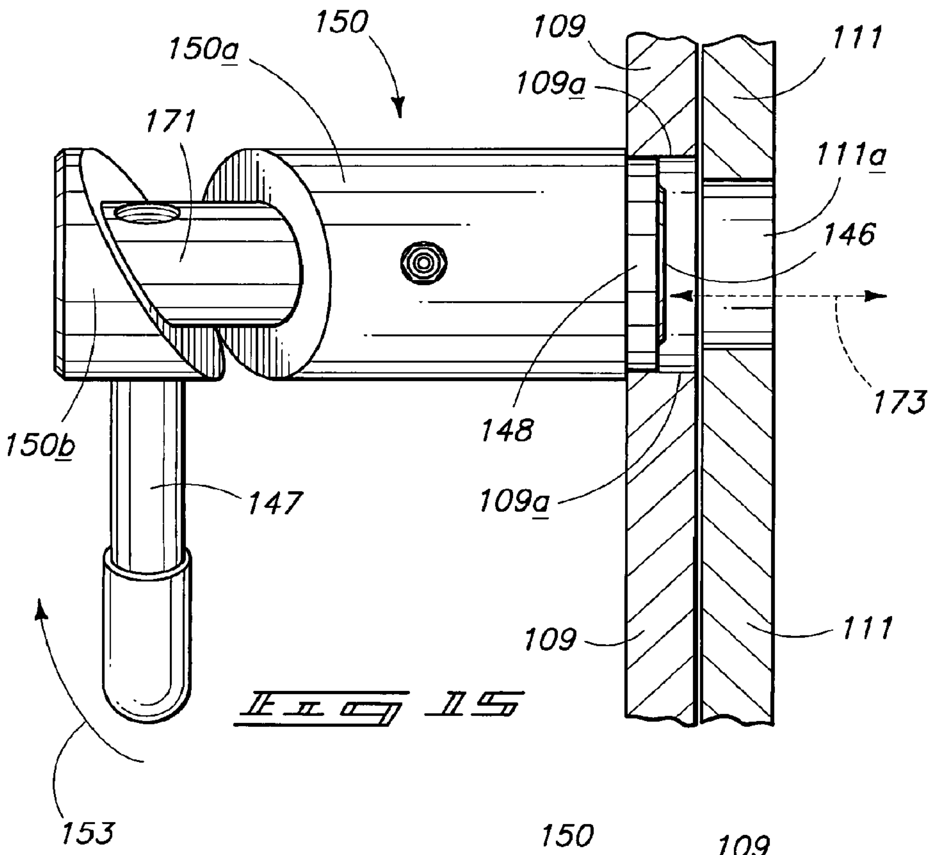
FIG. 15 is a front elevation view of the spring pin illustrated in FIG. 10, with the handle more fully rotated.

FIG. 14 shows handle 147 rotated approximately 45° from the position shown in FIG. 11. FIG. 15 illustrates handle 147 rotated approximately 90° from the position shown in FIG. 11, with the corresponding of the retraction of pin 146 into shoulder mount 148. In FIGS. 15-16 it is illustrated how the retraction of pin 146 then provides for the relative or allows the relative movement of second tower structure 111 relative to first tower structure 109. It should be kept in mind that first tower structure 109 and second tower structure 111 as shown in FIG. 16 is just a cross section and second tower structure 111 is actually a similarly shaped component within the internal cavity of first tower structure 109.

Looking back to FIG. 6, it is clear how spring pin 153 for instance may be placed such that the pin therein is in its fully retracted position and when fifth tower structure 114 is slid to the left relative to fourth tower structure 113 that pin 146 would ride on the exterior surface of fifth tower structure 114 until an aperture in fifth tower structure 114 aligns with the pin and the spring is released so that the spring pin 153 inserts into the pin aperture in fifth tower structure 114 thereby securing fifth tower structure 114 relative to fourth tower structure 113. Similarly, second tower structure 111, third tower structure 112 and fourth tower structure 113 each have pin apertures therein to align with and receive pins respectively from first spring pin 150, second spring pin 151, and third spring pin 152 to provide the relative securement of the respective tower support structures relative to one another.

While this particular configuration of spring pin is utilized, it will be appreciated by those of ordinary skill in the art that other biasing means for inserting attachment pins between tower structures may be utilized in the contemplation of this invention to provide for the secured expansion of one tower structure relative to another.

It is an advantage in using these pins a simple way to allow the relative securement of one tower structure relative to another so that the height of equipment, such as a boom truck with a boom that needs to reach the full height 186 as opposed to the reduced height 187 in order to fully extend and erect the mobile tower system 100.

FIG. 12 is a second end view of the pin or spring that may be utilized in the expansion of the mobile tower system illustrated in FIG. 1.

FIG. 13 is a front elevation view of the pin or spring that may be utilized in the expansion of the mobile tower system illustrated in FIG. 1, with the handle partially rotated.

FIG. 14 is a front elevation view of the pin or spring that may be utilized in the expansion of the mobile tower system illustrated in FIG. 1, with the handle more fully rotated.

FIG. 15 is a front elevation view of the pin or spring that may be utilized in the expansion of the mobile tower system illustrated in FIG. 1, with the handle more fully rotated.

FIG. 16 is a front elevation view of the pin or spring that may be utilized in the expansion of the mobile tower system illustrated in FIG. 1, with the handle fully rotated to its fully biased position.

Figure 17:
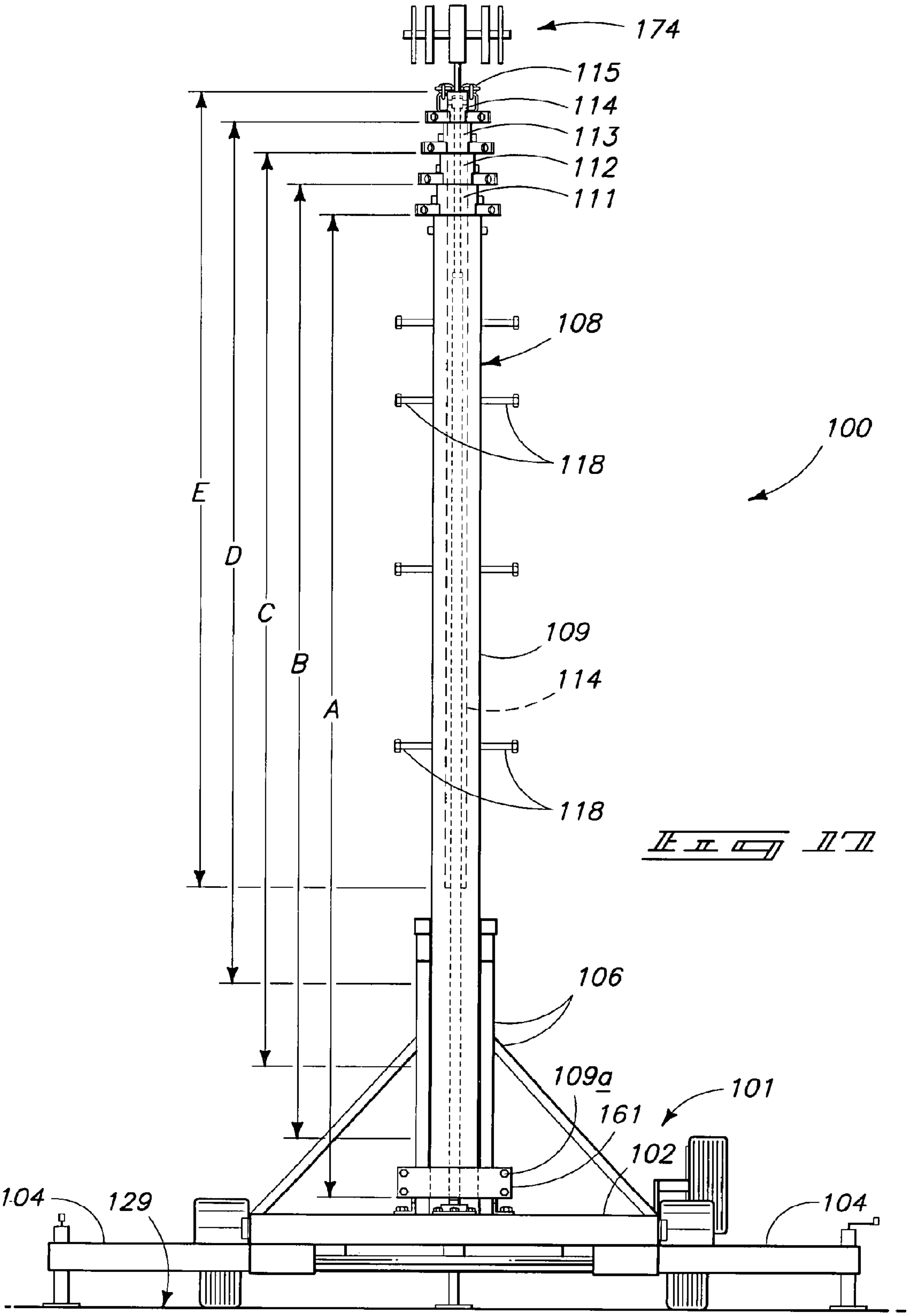
FIG. 17 is a rear view of the embodiment of the mobile tower system as illustrated in FIG. 1, only wherein a hydraulic cylinder is internally provided in the towers to drive the expansion of the tower to its fully extended vertical position.

FIG. 17 is a rear view of the embodiment of the mobile tower system as illustrated in FIG. 1, only wherein a hydraulic cylinder is internally provided in the towers to drive the expansion of the tower to its fully extended vertical position. FIG. 17 includes items and components identified with respect to FIG. 1 and other Figures, and like numbered items or components will therefore not be described in detail again with respect to FIG. 17. FIG. 17 shows hydraulic cylinder 119 in the center of the tower structures and also shows the respective lengths of the tower structures, namely length A for first tower structure, length B for second tower structure, length C for third tower structure, length D for fourth tower structure and length E fifth tower structure.

It will be appreciated by those of ordinary skill in the art that any one of a number of different lengths may be utilized for any one of the towers sliding within another, with no one in particular being required to practice the invention. It will also be appreciated by those of ordinary skill in the art that any one of a number of different tower structures may be utilized, including 2, 3, 4, 5 or more, within the contemplation of this invention.

In aspects or embodiments of this invention, a boom truck or crane or other device may be utilized to extend the powers with respect to one another. If it is desired to minimize the size of the boom truck or crane required, the preferred way to raise the towers is to attach the crane or boom truck to the uppermost tower structure first, by means such as chain 115 attached to the tower structure, and then to raise that tower structure to a position where the spring pins into a spring pin aperture from the fourth tower structure 113, which then locks into place in an aperture within fifth tower structure 114. Once this is locked in the extended position, then the boom or crane can be attached to the next uppermost tower and it can be raised with respect to the one directly beneath it, and so on until the entire tower is raise one section at a time. It will be appreciated by those in the art that a feature or aspect of this invention only requires a boom truck to be able to span the height of two sections, namely the lower section and the section which is being raised at that time, as opposed to requiring a crane to span the entire length of the tower when it is raised. This feature will also be true in later embodiments such as those wherein a hydraulic cylinder is placed within the tower structures and used for the raising of each individual tower.

Figure 18:
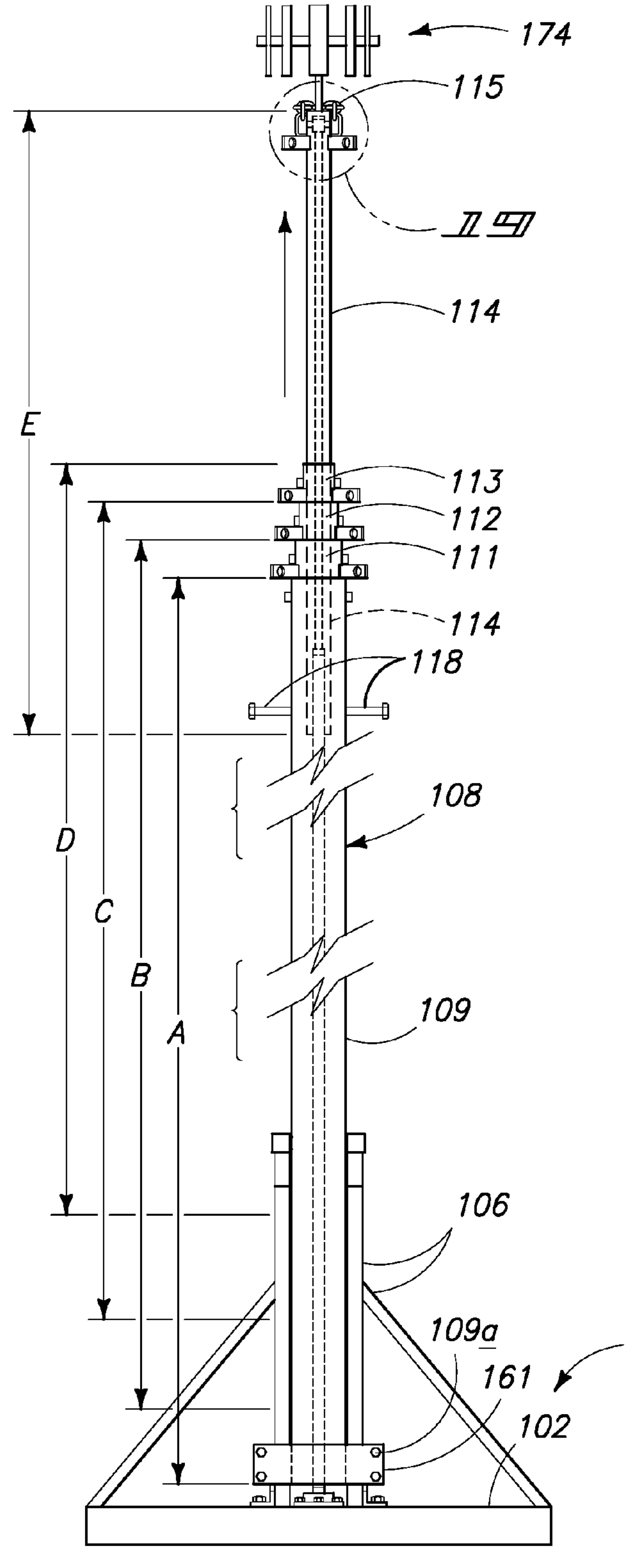
FIG. 18 is a rear elevation view of the embodiment of the mobile tower system as illustrated in FIG. 17, showing the hydraulic cylinder raising or extending the fifth tower structure relative to the fourth tower structure.

FIG. 18 is a rear elevation view of the embodiment of the mobile tower system as illustrated in FIG. 17, showing the hydraulic cylinder 119 raising or extending the fifth tower structure relative to the fourth tower structure. Like numbers in FIG. 18 are the same items or components as in FIG. 17 and will not therefore be repeated herein. In the embodiment of the invention shown in FIG. 18 where internal hydraulic cylinder 119 is utilized to raise the respective tower structures with respect to one another, a pin or other mechanism may be placed through apertures in the tubular wall of each, or across each to allow the hydraulic cylinder or top of the cylinder ram to engage it to raise that tower structure. After a given tower structure is raised to its extended position, the hydraulic cylinder ram may then be retracted back down to the next tower structure. Once the hydraulic cylinder is lowered down to or below the top of the next tower structure, a pin may be placed in that tower structure and that particular tower structure may then also be raised.

The tower structures are raised until the spring pins engage the spring pin apertures on the tower structure within the internal cavity of that tower structure, thereby securely fixing one tower structure relative to an adjacent tower structure from further vertical movement. It will also be appreciated by those of ordinary skill in the art that one or more spring pins may be mounted on a given tower structure to help secure the tower structures with respect to one another, such as two spring pins, three spring pins or four spring pin's around a given tower.

Figure 19:
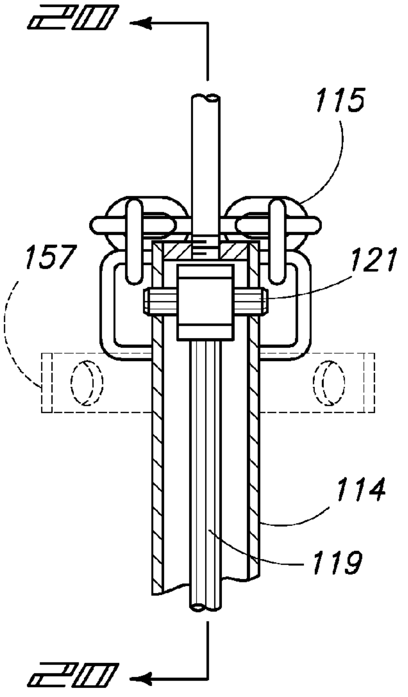
FIG. 19 is detail 19 from FIG. 18.
Figure 20:
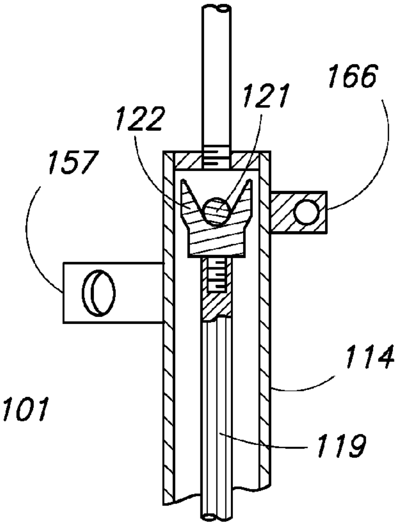
FIG. 20 is cross-sectional view 20-20 from FIG. 19.

FIG. 19 is detail 19 from FIG. 18, and shows hydraulic cylinder ram 119 with pin 121 placed through pin apertures in fifth tower structure 114. The top of the hydraulic ram may include a V-shaped adapter 122 as shown in FIG. 20 to engage and push on pin 121 to move that tower structure upward. Once a given tower structures such as fifth tower structure 114 is moved in locked into its upward or extended position, then hydraulic cylinder ram 119 may be lowered down to a position below the fourth tower structure 113, a pin inserted into apertures to then engage or be engaged by the hydraulic cylinder ram 119 and its adapter 122. If this sequence or procedure is followed sequentially, each tower structure is then extended upward to a position which is fixed relative to the tower structure directly beneath it or directly surrounding it, and then the next in sequence is similarly raised, until the entire tower structure is erected at the desired height.

FIG. 20 is cross-sectional view 20-20 from FIG. 19, and shows the hydraulic cylinder ram 119 and adapter 122 in gauging pin 121 to raise fifth tower structure 114 upwardly. Guide wire support 157 includes an aperture through which a guide wire may be attached if additional stabilization is required or desired for that particular tower structure.

There are alternatives to the use of a boom truck to raise the mobile tower system. One such alternative is the use of an internal hydraulic cylinder wherein a pin or other structure may be placed internally within the internal cavity of the tower structures 111, 112, 113, 114. If the cylinder is mounted within first tower structure 109 such that it extends up to and interacts with fifth tower structure 114 such that when the ram of the hydraulic cylinder is fully extended it has sufficient length to move the spring pin aperture in fifth tower structure 114 in alignment with fourth spring pin 153 so that fifth tower structure 114 is secured relative to fourth tower structure 113. Once secured, the ram of the hydraulic cylinder may be retracted and a bolt or other structure then attach to fourth tower structure 113 to go through the same procedure to extend it relative to third tower structure 112. If this procedure is sequentially followed with respect to pins being placed in the tower structures the entire tower can be erected with one internal hydraulic cylinder and no boom truck or other external equipment is required to practice the invention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A mobile tower system comprising:

a mobile chassis, and wheels operatively attached to the mobile chassis;

a tower framework mounted to the mobile chassis;

a tubular first tower structure mounted in a substantially vertical operational position, the first tower structure being tubular with a first tower structure internal cavity;

a tubular second tower structure with a second tower structure internal cavity and which is slidably disposed within the first tower structure internal cavity, the second tower structure including a first tower spring aperture;

a third tower structure slidably disposed within the second tower structure internal cavity;

a first tower spring biased pin mounted to an outer surface of the first tower structure with an inwardly biased pin extending through a first tower structure spring aperture in the first tower structure;

such that when the third tower structure is slid to an extended position relative to the second tower structure, the biased pin of the second tower pin springs into the third tower structure spring aperture in the third tower structure to secure the third tower structure relative to the second tower structure;

further such that when the second tower structure is slid to an extended position relative to the first tower structure, the biased pin of the first tower pin springs into the second tower structure spring aperture in the second tower structure to secure the second tower structure relative to the first tower structure; and an extendable hydraulic ram with a tower engaging adapter, the ram being attached to the tower framework and configured to raise the second tower structure relative to the first tower structure and also configured to raise the third tower structure relative to the second tower structure.

2. A mobile tower system as recited in claim 1, and further comprising a fourth tower structure with a fourth tower structure spring aperture therein, wherein the third tower structure includes a third tower structure spring aperture, and further wherein the mobile tower system further comprises a third tower spring biased pin mounted to an outer surface of the third tower structure with an inwardly biased pin extending through the fourth tower structure spring aperture;

such that when the fourth tower structure is slid to its extended position relative to the third tower structure, the spring biased pin of the third tower springs into the fourth tower structure spring aperture to secure the fourth tower structure relative to the third tower structure; and wherein the extendable hydraulic ram is further configured to engage the fourth tower structure and extend it outward from the third tower structure.

3. A mobile tower system as recited in claim 1, and further comprising a second tower spring biased pin mounted to an outer surface of the second tower structure with an inwardly biased pin extending through a first spring biased pin aperture in the second tower structure; and such that when the third tower structure is slid to an extended position relative to the second tower structure, the spring biased pin of the second tower springs into the first tower spring aperture in the third tower structure to secure the third tower structure relative to the second tower structure.

4. A mobile tower system as recited in claim 1, and further comprising a hydraulic cylinder mounted within the tower structures and disposed to slide the second tower structure with respect to the first tower structure.

5. A method of erecting a mobile tower system, comprising:

providing a mobile chassis, and wheels operatively attached to the mobile chassis;

providing a tower framework mounted to the mobile chassis;

providing a tubular first tower structure mounted to the tower framework positioned in a substantially vertical position, the first tower structure being tubular with a first tower structure internal cavity and including a first tower spring biased pin mounted to an outer surface of the first tower structure with an inwardly biased pin extending through a first tower spring aperture in the first tower structure;

providing a tubular second tower structure with a second tower structure internal cavity and which is slidably disposed within the first tower structure internal cavity, the second tower structure including a second tower spring aperture therein; and sliding the second tower structure outward from the internal cavity of the first tower structure until the spring biased pin of the first tower springs into the second tower spring aperture in the second tower structure to secure movement of the second tower structure relative to the first tower structure.

6. A method of erecting a mobile tower system, comprising:

providing a mobile chassis, and wheels operatively attached to the mobile chassis;

providing a tower framework mounted to the mobile chassis;

providing a tubular first tower structure mounted to the tower framework positioned in a substantially vertical position, the first tower structure being tubular with a first tower structure internal cavity and including a first tower spring biased pin mounted to an outer surface of the first tower structure with an inwardly biased pin extending through a first tower spring aperture in the first tower structure;

providing a tubular second tower structure with a second tower structure internal cavity and which is slidably disposed within the first tower structure internal cavity, the second tower structure including a second tower spring aperture;

providing a third tower structure slidably disposed within the second tower structure internal cavity;

providing second tower spring biased pin mounted to an outer surface of the second tower structure with an inwardly biased pin extending through a second tower structure spring aperture in the second tower structure;

providing an extendable hydraulic ram with a tower engaging adapter, the ram being attached to the tower framework and configured to engage each of the first tower structure and second tower structure; and further wherein the hydraulic ram has an expanded length which is approximately the length of the first tower structure and the second tower structure and a contracted length which is approximately the length of the first tower structure;

extending the hydraulic ram to slide the third tower structure outward from the internal cavity of the second tower structure until the spring biased pin of the second tower structure springs into the second tower spring aperture in the third tower structure to secure movement of the third tower structure relative to the second tower structure;

retracting the hydraulic ram to engage the second tower structure and then extending the hydraulic ram to slide the second tower structure outward from the internal cavity of the first tower structure until the spring biased pin of the first tower structure springs into the second tower structure spring aperture in the second tower structure to secure the second tower structure relative to the first tower structure.

7. A method of erecting a mobile tower system as recited in claim 6, and further wherein an internal hydraulic cylinder is used to slide the third tower structure outward from the internal cavity of the second tower structure until the spring biased pin of the second tower structure springs into the third tower spring aperture in the third tower structure to secure movement of the third tower structure relative to the second tower structure.

8. A method of erecting a mobile tower system as recited in claim 7, and further wherein an internal hydraulic cylinder is used to slide the second tower structure outward from the internal cavity of the first tower structure until the spring biased pin of the first tower structure springs into the second tower spring aperture in the second tower structure to secure movement of the first tower structure relative to the first tower structure.

9. A method of erecting a mobile tower system as recited in claim 6, and further:

providing an extendable hydraulic ram with a tower engaging adapter, the ram being attached to the tower framework and configured to engage each of the first tower structure and second tower structure to raise the second tower structure relative to the first tower structure;

engaging the tower engaging adapter of the ram on the third tower structure and raising the third tower structure; and retracting the ram and then engaging the tower engaging adapter of the ram on the second tower structure and raising the second tower structure and thereby also raising the third tower structure.

* * * * *